United States Patent [19]

Himmele et al.

[11] 3,886,168

[45] May 27, 1975

[54] N-SUBSTITUTED 1-AMINOMETHYLINDANES

[75] Inventors: Walter Himmele, Walldorf; August Amann; Werner Aquila, both of Ludwigshafen; Hubert Giertz, Limburgerhof; Hardo Siegel, Speyer, all of Germany

[73] Assignee: Badische Anilin- & Soda-Fabrik Aktiengesellschaft, Ludwigshafen (Rhine), Germany

[22] Filed: July 20, 1972

[21] Appl. No.: 273,456

[30] Foreign Application Priority Data

July 26, 1971  Germany.............................. 2137276

[52] U.S. Cl.... 260/293.62; 260/239 B; 260/239 BF; 260/247.2 R; 260/247.2 B; 260/247.5 B; 260/268 BC; 260/295 F; 260/296 B; 260/326.33; 260/326.5 C; 260/326.85; 260/465 E; 260/471 A; 260/518 R; 260/519; 260/570.6; 260/570.9; 424/244; 424/250; 424/263; 424/267; 424/274; 424/285; 424/330

[51] Int. Cl............................................ C07d 29/10

[58] Field of Search....... 260/293.54, 293.62, 570.6, 260/570.9

[56] References Cited
UNITED STATES PATENTS

| | | | |
|---|---|---|---|
| 3,704,323 | 11/1972 | Krapcho | 260/576 |
| 3,706,756 | 12/1972 | Werner | 260/295.5 |
| 3,725,412 | 4/1973 | Houlihan et al. | 260/268 BZ |
| 3,794,645 | 2/1974 | Pieper et al. | 260/239 B |

OTHER PUBLICATIONS

Lahiri et al., J. Pharm. Sc. 57, 1013–1016 (1968).
Seidl et al., Tetrahedron 20, 633–640 (1964).

*Primary Examiner*—G. Thomas Todd
*Attorney, Agent, or Firm*—Johnston, Keil, Thompson & Shurtleff

[57] ABSTRACT

New 1-aminomethylindans and methods of producing them. The compounds are distinguished by their pharmacological effectiveness, particularly by their actions of lowering blood pressure and inhibiting inflammation and by their parasympathicolytic and central nervous system stimulating effects.

3 Claims, No Drawings

N-SUBSTITUTED 1-AMINOMETHYLINDANES

The invention relates to new 1-aminomethylindans bearing substituents on the nitrogen and having the formula (I):

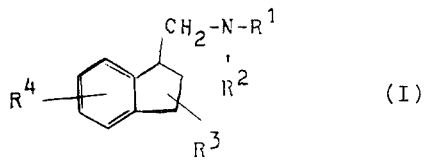

(I)

in which
 $R^1$ is hydrogen, alkyl, cycloalkyl, heterocycloalkyl, aralkyl, alkoxyalkyl, alkoxy aryl, furfuryl, tetrahydrofurfuryl and pyridyl-(2).
 $R^2$ is alkyl, cycloalkyl, heterocycloalkyl, aralkyl, alkoxyalkyl, alkoxyl or aryl;
 $R^1$ and $R^2$ together with the nitrogen form a heterocycle;
 $R^3$ is hydrogen or alkyl; and
 $R^4$ is hydrogen, alkyl, carboxyalkyl, hydroxyl, alkoxyl, carboxyl, nitro, nitrilo or halogen,
and to pharmaceutically useful salts of the same.

Heubner and co-workers (J. org. Chem., 27, 4465 (1962)) disclose the production of 1-aminomethyl-2-aminoindan by reduction of o-phenylene-bis-acetonitrile. They intimate that such compounds may possibly have analgesic action, Seidl, Huisgen and J. H. Hill prepare 1-aminomethylindan by reduction of indan-1-carboxamide (Tetrahedron, 20, 633 to 640 (1964)). The work of Seidl does not contain any reference to pharmacological activity. In fact the compound having $R^1$ and $R^2$ denoting hydrogen exhibits no action sufficient for pharmacological exploitation.

We have now found that the new N-substituted 1-aminomethylindans lower blood pressure, inhibit inflammation and have parasympathicolytic and central nervous system stimulating actions.

The compounds of this invention are in the form of their salts for testing and application. Hydrohalic acids such as hydrogen chloride, hydrogen bromide and hydrogen iodide are particularly suitable for the production of the salts; sulfuric and phosphoric acids are also suitable. Organic acids such as oxalic, tartaric and benzoic acids are also suitable in addition to the inorganic acids. Generally speaking, these acids are those whose anion is capable of yielding pharmacologically useful salts with the basic 1-aminomethylindans. The compounds may also be converted into quaternary ammonium salts. The compounds may also be used in combination with other active ingredients.

The meanings of $R^1$ and $R^2$ in formula (I) may vary within wide limits. Among the alkyl radicals, lower to middle alkyl radicals, i.e. those of one to twelve carbon atoms are preferred, for example methyl, ethyl, propyl, isopropyl, n-butyl, isobutyl, t-butyl, pentyl and hexyl. Cyclohexyl and cyclooctyl are the preferred cycloalkyl radicals. The cycloalkyl radicals may also bear endo-bridges. Benzyl, phenylethyl and phenylpropyl are the preferred aralkyl radicals. The alkoxyalkyl radical is preferably a $C_1$ to $C_4$—$OC_1$—yl to —$OC_4$—yl radical and the alkoxy radical is preferably a $C_1O$ to $C_4O$ radical. Linear or branched alkyl radicals may bear hydroxyl, dialkylamino, alkoxy or cycloalkyl as substituents and/or may have double or triple unsaturation.

Phenyl and naphthyl are suitable aryl radicals. Aryl and aralkyl radicals may in turn bear substituents, for example alkyl and/or halogen. In addition to the special substituents $R_1$ and $R_2$ already mentioned, the following are suitable: 2-ethylhexyl-(1), 3-methylpentyl-(3), β-phenylethyl, 2-phenylpropyl-(1), β-hydroxyethyl, 3-methoxypropyl, 3-methoxypropyl, 3-dimethylaminopropyl-(1), p-methylphenyl, m-chlorophenyl, furfuryl, tetrahydrofurfuryl, and pyridyl-(2). Other possibilities and combinations for radicals $R^1$ and $R^2$ may be derived from the Examples. The meanings and combinations of $R^1$ and $R^2$ therein specified are understood to be included here although only a summary of these substituents is given.

Aminomethylindans having a tertiary-substituted nitrogen are emphasized because of their increased effect, particularly those in which

is dimethyl, diethyl, di-n-propyl, diisopropyl or di-n-butyl-amino. Stress is also laid on compounds having substituents which are not identical such as N-ethyl-N-n-butylamino, N-methyl-N-sec.-butylamino, N-ethyl-N-isopropylamino, N-propyl-N-isobutylamino, N-methyl-N-phenylamino or N-ethyl-N-phenylamino radicals and also N-alkyl-N-cycloalkylamino groups.

Emphasis should also be given to compounds in which $R^1$ and $R^2$ form together with the nitrogen a heterocycle such as pyrrolidine or morpholine or a heterocycle bearing an endo-bridge such as 2-azabicycloheptane-(2,2,1), but particularly piperidine and hexamethylimine. The heterocycles may also be substituted, preferably by alkyl groups.

The following are examples: 2-methylpiperidine, 3-methylhexamethylenimine, N-methylpiperazine and 2,6-dimethylmorpholine. Methyl is the preferred alkyl substituent.

The indan radical may bear other substituents as described above. The number of carbon atoms in the alkyl and alkoxyl radicals is preferably from 1 to 6 and particularly 1, and similarly in the alkyl moiety of the carboxyalkyl radical.

In the preferred compounds of formula (I) $R^3$ and $R^4$ is in each case hydrogen and $R^1$ and $R^2$ have the meanings given above.

Compounds in which $R^1$ and $R^2$ together with the nitrogen atom connecting them form a heterocyclic ring such as morpholine or a heterocycle bearing an endo-bridge such as 2-azabicycloheptane-(2,2,1) are particularly emphasized. The heterocyclic ring may bear one or more lower alkyl radicals as substituents. Examples are N-methylpiperazine and 2,6-dimethylmorpholine.

Compounds in which $R^1$ and $R^2$ together with the nitrogen atom form a cyclic imine of five to seven ring members, if desired bearing one or more lower alkyl radicals as substituents, are however particularly suitable.

Examples are 1-piperidinomethylindan, 1-pyrrolidino-methylindan, 1-hexamethyleniminomethylindan, 1-(2-methylpiperidino)methylindan, 1-(3-methylpiperidino)methylindan, and the 2,6-dimethylpiperidino, 3,5-dimethylpiperidino, 3,5-diethylpiperidino and 3-ethyl-4-propyl compounds.

The new 1-aminomethylindans may be prepared in conventional manner by first forming a 1-formylindan from an indene by hydroformylation (reaction with carbon monoxide and hydrogen in the presence of a catalyst containing rhodium) and then converting the 1-formylindan into the 1-aminomethylindan in conventional manner by reaction with a monosubstituted or disubstituted amine. Known methods such as the Leuckardt-Wallach reaction or a catalytic method such as aminating hydrogenation may be used for the reaction with amines.

Compounds of the formulae (II), (III) and (IV):

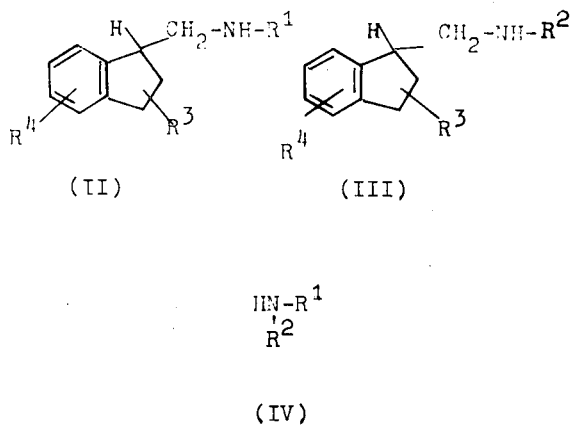

may also be completed to secondary or tertiary amines by substitution, for example by alkylation, or by closing the ring to a morpholine or piperazine in a compound of the formula (V):

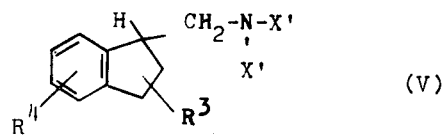

in which X' is for example —CH$_2$CH$_2$OH or —CH$_2$CH$_2$NH$_2$ and alkylating —NH for example in the piperazine radical.

It should be emphasized that the new 1-aminomethylindans can be prepared by a known method from 1-formylindans by reductive amination. A formylindan of the formula:

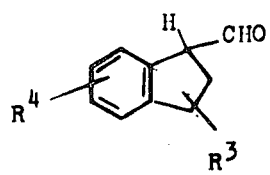

in which
R$^3$ and R$^4$ have the meanings given above is condensed with an amine

in which R$^1$ and R$^2$ have the said meanings and reduced. The reduction to the amino compound may take place simultaneously with the amine reaction or subsequently. Known methods for the reductive amination are the Leuckardt-Wallach reaction or the aminating hydrogenation or hydrogenation of the enamine formed as intermediate from a formylindan and an amine.

The N-substituted 1-aminomethylindans may be purified by distillation at subatmospheric pressure. Further purification may be carried out via the crystalline salts and decomposition of these salts with alkali.

1-aminomethylindans of formula (I) have a centre of asymmetry in the 1-position of the indan ring. The amines may be split into optical antipodes by known methods. Thus for example by racemate fission with (—)-dibenzoyltartaric acid, a (+)-rotatory diethylaminomethylindan hydrochloride $[\alpha]_{546}= 47.5°$ (c = 1.0 methanol) is obtained. The corresponding (—)-rotatory antipode may be recovered from the mother liquors from the separation.

When 1-aminomethylindas bearing substituents on the nitrogen atom are administered perorally and intravenously they cause a prolonged lowering of blood pressure, have a stimulating effect on the central nervous system and have inflammation-inhibiting and parasympathicolytic action. The paraysmpathicolytic effect is demonstrated by the fact that the substances according to the invention may protect mice from eserine death. It is particularly important that the subtances have only low toxicity in peroral and intraperitoneal administration.

The effect of lowering blood pressure is determined by the usual method on rats which have been narcotized with urethane. The blood pressure is measured from the carotid artery by means of Statham elements. The intravenous injection of the test substances is carried out through a cannula bound into the jugular vein. The fall in blood pressure following administration of the test substance is measured in mm Hg. The experiments are generally stopped thirty minutes after administration of the test substances.

The blood pressure lowering action of some 1-aminomethylindans bearing substituents on the nitrogen is indicated in the following Table:

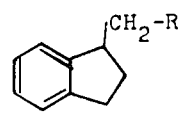

The following abbreviations are used in the Table:
TPO = peroral toxicity in mg/kg
TPI = intraperitoneal toxicity in mg/kg
Maximum BP decrease = maximum decrease in blood pressure after intravenous injection of 5, 1, 0.25 mg/kg
DAM = duration of the action in minutes.

| R = | TPO | TPI | Maximum BP decrease | | | | DAM |
|---|---|---|---|---|---|---|---|
| | | | 5 | 1 | 0.25 | 0.05 | |
| —N(CH₃)₂ | | 150 | 25 | 15 | | 5 | >30 10 |
| —N(C₂H₅)₂ | | 100 | 20 | 15 | 10 | | >30 12 |
|  | | 75 | 20 | 15 | 10 | | >30 10 |
| 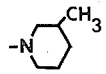 | >200 | 150 | | 42 | 36 | 23 | >30 4 |
|  | >200 | 150 | 25 | 22 | 10 | | >30 20 |

The blood pressure lowering properties of the 1-aminomethylindans may also be demonstrated on cats and dogs. 1-(2-methylpiperidino)-methylindan proves to be particularly active. In intravenous administration to cats and dogs the action is closely dependent on dosage and is evident with a dose of only 0.2 mg/kg; a marked effect can be achieved with only 1 mg/kg in peroral administration. The point of attack appears to be the central nervous system because the substance does not lower the blood pressure in a spinal animal. There is however no stimulation of the vagus nerve. Since no appreciable side actions can be observed, a substance with such a mode of action is of outstanding therapeutic interest.

The amines and their salts may be obtained by methods described in the following Examples. Parts are by weight.

EXAMPLE 1

1-methylaminomethylindan:

A mixture of 73 parts of 1-formylindan and 78 parts of 40% solution of methylamine in methanol is hydrogenated in a 250-liter autoclave at 80°C and a hydrogen pressure of 50 atmospheres with 5 parts of Raney nickel for 6 hours. When the product is fractionated at a pressure of 5 mm Hg, 1-methylaminomethylindan (37 parts) passes over at from 98° to 102°C. The amine is taken up in 50 parts of methanol and then 42 parts of 48% aqueous hydrobromic acid is added. The hydrobromide has a melting point of 214°C after having been recrystallized from a mixture of equal parts of methanol and water.

EXAMPLE 2

1-dimethylaminomethylindan:

73 parts of 1-formylindan is reacted as described in Example 1 with a 50% solution of dimethylamine in methanol with a palladium silver catalyst on aluminum oxide. The amine (64 parts) passes over at from 98° to 103°C at a pressure of 5 mm Hg. The hydrobromide has a melting point of 217°C.

EXAMPLE 3

1-piperidinomethylindan:

75 parts of 1-formylindan, 60 parts of piperidine and 50 parts of cyclohexane are heated under reflux for 24 hours at a temperature of from 140° to 160°C in an apparatus fitted with means for azeotropic removal of water. 10 parts of aqueous phase is separated. Fractional distillation of enamine at 5.0 mm Hg gives 82 parts in a boiling point range of from 165° to 167°C. 50 parts of methanol is added to the enamine which is then hydrogenated by means of 5 parts of Raney cobalt at 60°C and 100 atmospheres of hydrogen within five hours. Fractional distillation of the hydrogenated product gives 61 parts of 1-piperidinomethylindan. The hydrobromide melts at 230°C.

EXAMPLE 4

1di-n-propylaminomethylindan:

0.25 mole (= 41 g) of 1-formylindan is heated under reflux with 30 g of di-n-propylamine together with 1.5 moles (= 69 g) of anhydrous formic acid for 8 hours in a 250-ml round flask fitted with a reflux condenser. The excess of formic acid is then removed in a water jet pump vacuum (temperature of flask up to 80°C). The residue has 120 g of 40% aqueous caustic potash solution added to it and it is boiled for an hour to saponify the formate. The free amine thus separates as an upper phase and can be separated in a separating funnel. The amine is then purified by distillation at subatmospheric pressure. Its boiling point is 97° to 100° at 0.3 mm Hg. The hydrobromide is prepared as described in Example 1 and it has a melting point of 135°C.

EXAMPLE 5

1-piperidinomethylindan:

75 g of 1-formylindan (97.5% according to gas chromatographic analysis) is heated under reflux together with 60 g of piperidine and 50 g of cyclohexane for twenty-four hours at from 140° to 160°C in apparatus suitable for removing water, 10 ml of aqueous phase is separated. Fractional distillation at 5.0 mm Hg gives 82 g of enamine having a boiling point of from 165°C to 167°C. The enamine is placed together with 50 g of methanol and 5 g of Raney cobalt in a vibrating autoclave and hydrogenated at 60°C with a hydrogen pressure of 100 atmospheres. The absorption of hydrogen is over after five hours. Fractionation of the reaction mixture at a pressure of 5 mm Hg gives 61 g of 1-piperidinomethylindan in the boiling range from 132° to 134°C. The hydrobromide is prepared and purified in the manner described in Example 1. The melting point of the hydrobromide is 230°C.

EXAMPLE 6

1-(2-methylpiperidino)-methylindan:

37 parts of 1-formylindan, 33 parts of 2-methylpiperidine and 69 parts of anhydrous formic acid are boiled together under reflux for 12 hours. The procedure described in Example 4 is then followed. 48 parts of 1-(2-methylpiperidino)-methylindan is obtained having a boiling point of 155° to 160°C at 7 mm Hg. The hydrochloride has a melting point of 165°C.

Other Examples are collected in the following Table. $R^3$ and $R^4$ in the compounds specified are hydrogen in each case.

| Example | $R^1$ | $R^2$ | b.p. (Amine) | b.p. (salt) |
|---|---|---|---|---|
| 7 | —$C_2H_5$ | —$C_2H_5$ | 110–115°C/5.0 mm Hg | HBr = 146°C |
| 8 | H | —$(CH_2)_3$—O—$CH(CH_3)_2$ | 126–130°C/5.0 | HBr = 208°C |
| 9 | iso—$C_3H_7$ | iso—$C_3H_7$ | 128–130°C/5.0 | HBr = 189°C |
| 10 | H | $C_2H_5$ | 105–110°C/5.0 | HBr = 220°C |
| 11 | H | n—$C_3H_7$ | 140–141°C/5.0 | HBr = 181°C |
| 12 | H | n—$C_4H_9$ | 98–102°C/0.4 | HBr = 247°C |
| 13 | H | iso—$C_4H_9$ | 115–117°C/5.0 | HBr = 151°C |
| 14 | H | sec—$C_4H_9$ | 121–124°C/5.0 | HBr = 154°C |
| 15 | H | n—$C_8H_{17}$ | 168–170°C/5.0 | HBr = 245°C |
| 16 | —$(CH_2)_4$— | | 108–110°C/0.2 | HBr = 243°C |
| 17 | —H | —$CH_2$—$CH_2$—CH(—C$_6$H$_5$)$CH_3$ | 183–184°C/0.3 | HBr = 187°C |
| 18 | — H | —$CH_2$—CH(—C$_6$H$_5$)$CH_3$ | 178–180°C/0.5 | HBr = 225°C |
| 19 | —$(CH_2)_6$— | | 144–151°C/5 | HBr = 251°C |
| 20 | —$(CH_2)_2$—O—$(CH_2)_2$— | | 152–153°C/5 | HBr = 266°C; HCl = 242°C |
| 21 | —N($CH_3$)—$(CH_2)_2$— | | 147–152°C/5 | 2 HBr = >270°C |
| 22 | —H | —$CH_2$—$CH_2$—C$_6$H$_5$ | 150–151°C/0.3 | HBr = >260°C |
| 23 | —H | (norbornenyl) | 162–168°C/5 | HBr = 210°C |
| 24 | —H | —C($CH_3$)$_2$—CH($CH_3$)—$CH_3$ | 130–135°C/5 | HBr = 190°C |
| 25 | —$CH_3$ | —$CH_2$—$CH_2$—CH(—C$_6$H$_5$)($CH_2$—$CH_3$) | 169–177°C/0.5 | HBr = 222°C |
| 26 | —H | —C($CH_3$)($CH_2$—$CH_3$)$_2$ | 100–102°C/5 | HBr = 131°C |
| 27 | —H | —$CH_2$—CH($CH_2$—$CH_3$)—$CH_2$—$CH_2$—$CH_2$—$CH_3$ | 170–175°C/5 | HBr = 178°C |
| 28 | —$CH_2$—C($CH_3$)$_2$—$CH_2$—$CH_2$— | | 130–134°C/5 | HBr = 248°C |
| 29 | —H | —$CH_2CH_2$—OH | 158–164°C/5 | HBr = 196°C |
| 30 | —H | —CH($CH_3$)$_2$ | 110–114°C/5 | HBr = 192°C |
| 31 | —H | —$CH_2$—$CH_2$—$CH_2$—N($CH_3$)$_2$ | 150–155°C/5 | 2 HBr = 217°C |
| 32 | —H | —$CH_2$—$CH_3$ (cyclo) | 163–177°C/5 | HBr = 220°C |
| 33 | —H | —C($CH_3$)$_3$ | 105 –122°C/5 | HBr = 206°C |
| 34 | —$CH_3$ | —$CH_2$—$CH_2$—$CH_2$—$CH_3$ | 98–103°C/0.5 | HI = 151°C |
| 35 | —CH($CH_3$)$_2$ | (cyclohexyl) | 148–155°C/0.5 | HI = 187°C |
| 36 | —$CH_2$—CH($CH_3$)—$CH_2$—$CH_2$—$CH_2$— | | 100–109°C/0.5 | HBr = 217°C |
| 37 | —$CH_2$—$CH_2$—CH($CH_3$)—$CH_2$—$CH_2$—$CH_2$— | | 121–124°C/0.5 | HBr = 216°C |
| 38 | —$CH_3$ | (cyclohexyl) | 142–150°C/0.5 | HCl = 186°C |
| 39 | —H | —$CH_2$—CH=$CH_2$ | | HBr = 230°C |
| 40 | —$C_2H_5$ | —CH($CH_3$)$_2$ | 125–128°C/5.0 | |
| 41 | —$C_3H_7$ | —CH($CH_3$)$_2$ | 175–177°C/20 | |
| 42 | —H | —$CH_2CH(CH_3)$—$C_3H_7$ | 198–203°C/5.0 | |

-Continued

| Example | R¹ | R² | b.p. (Amine) | b.p. (salt) |
|---|---|---|---|---|
| 43 | —CH₃ | —(CH₂)₅—CH₃ | 160–163°C/5.0 | |
| 44 | —H | —CH₂—C≡CH | | HBr = 230°C |
| 45 | —CH₂—CH₂—CH₃ | ⟨H⟩ | 146–150°C/0.5 | |
| 46 | —CH₂—CH(CH₃)CH₃ | ⟨H⟩ | 177–179°C/0.5 | |
| 47 | —CH(CH₃)—CH₂—CH₃ | ⟨H⟩ | 165–170°C/0.5 | |
| 48 | —CH₂—CH₂—CH₂—CH₃ | ⟨H⟩ | | HI = 161°C |
| 49 | 2,6-dimethylpiperidino | | | HCl = 192°C |
| 50 | 3-ethyl-4-propylpyrrolidino | | | HBr = 164°C |
| 51 | 3,5-diethylpiperidino | | | HBr = 180°C |
| 52 | 3,5-dimethylpiperidino | | | HCl = 164°C |

1. A compound of the formula

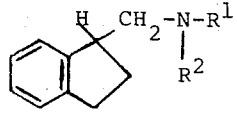

in which R¹ and R² taken together with the nitrogen represent piperidino or piperidino substituted by lower alkyl; and pharmaceutically active salts thereof.

2. 1-(2-methylpiperidino)-methylindan.
3. 1-(2,6-dimethylpiperidino)-methylindan.

* * * * *